3,021,320
POLYMERIZATION OF ETHYLENE WITH CATA-
LYSTS OF ALKALI METAL BOROHYDRIDES,
ALUMINUM HALIDES AND GROUP IVB METAL
HALIDES
Carl N. Zellner, Berkeley Heights, N.J., and Alfred J.
Porck, Buffalo, N.Y., assignors to Celanese Corpora-
tion of America, New York, N.Y., a corporation of
Delaware
No Drawing. Filed June 7, 1957, Ser. No. 664,188
17 Claims. (Cl. 260—94.9)

This invention relates to the polymerization of ethylene and to catalysts especially adapted for use in the polymerization of ethylene.

The polymerization of ethylene in the presence of metal alkyls has been proposed previously. The metal alkyls are, however, spontaneously inflammable in air and extremely sensitive to moisture so that they are dangerous and difficult to handle.

It has been proposed to overcome these defects by the use of a catalyst prepared by mixing a metal hydride, such as sodilm hydride or, preferably, lithium aluminum hydride; and aluminum trihalide such as aluminum chloride, aluminum bromide, aluminum fluoride or aluminum iodide; and a halide of a metal of group IV$b$, such as a chloride, bromide, fluoride or iodide of titanium, zirconium, hafnium or thorium. The preferred catalyst system comprises lithium aluminum hydride, aluminum chloride and titanium tetrachloride. A complete description of polymerization in accordance with this proposal may be found in the copending application of Carl N. Zellner, Ser. No. 561,986, filed January 30, 1956.

It is an object of this invention to provide a process for the polymerization of ethylene which will retain the advantages of LiAlH$_4$-AlCl$_3$-TiCl$_4$ system while permitting much higher yields of polymer to be obtained.

Another object of this invention is the provision of a novel catalyst system for the polymerization of ethylene.

Still another object of this invention is to provide a relatively simple and non-hazardous, but effective, polymerization catalyst.

A further object is the provision of a new method for the production of crystalline polyethylene of unusually high melting point.

Another object is to accomplish the polymerization of ethylene at relatively low pressures and temperatures to yield products with special properties.

Other objects of this invention will be apparent from the following detailed description and claims. In this description and claims all proportions are by weight unless otherwise indicated.

These and other objects are accomplished by polymerizing ethylene in a catalyst system formed by mixing a metal borohydride, such as sodium borohydride; an aluminum trihalide such as aluminum chloride, aluminum bromide, aluminum fluoride or aluminum iodide; and a halide of a metal of group IV$b$, such as a chloride, bromide, fluoride or iodide of titanium, zirconium, hafnium or thorium.

The polymerization reaction using the catalyst system of this invention is preferably carried out in the presence of an inert solvent for ethylene, such as an aromatic, aliphatic or cycloaliphatic hydrocarbon. Examples of suitable solvents are benzene, toluene, xylene, cyclohexane, decahydronaphthalene and dodecane. When a solvent is employed it is advantageous to pass a stream of ethylene gas continuously through a dispersion of the catalyst in the solvent and to agitate the reaction mixture vigorously so as to promote adsorption of the ethylene on the catalyst surface. Unreacted ethylene which escapes from the reaction mixture may be recovered and returned thereto. After a suitable period of reaction, e.g. 2 hours, the desired polymer, which is present in the insoluble solid phase in the reaction mixture, may be separated from the liquid.

The effectiveness of the catalyst may be increased by coating or adsorbing the catalyst onto a relatively inert solid carrier. For example, sodium borohydride may be added to a stirred suspension of powdered solid, such as crushed cryolite, in xylene, decahydronaphthalene, or other inert solvent so as to precipitate said borohydride on said solid, and aluminum chloride and titanium tetrachloride may thereafter be added to the resulting mixture. Other solid carriers are natural clays, silica-alumina cracking catalysts, charcoal, etc.

The proportions of the three components of the catalyst system may be varied widely. Excellent results have been obtained when the molar ratios of $$AlCl_3:TiCl_4:NaBH_4$$

range from 0.1:.1:1.0 to 1:1:1; i.e. a range of from about 1/10 to 1 mole of either or both metal halides to 1 mole of metal borohydride. Changes in the proportions of the catalyst components cause some variation in the melting points of the polyethylene produced. Thus, by increasing, in the catalyst system, the ratio of the amount of aluminum halide or the group IV$b$ metal halide to the amount of metal borohydride, the melting range of the resulting polymer may be lowered.

By the use of the catalyst systems of this invention the polymerization of ethylene may be carried out at low pressures, e.g. at pressures ranging from sub-atmospheric pressures to low superatmospheric pressures of several atmospheres. However, if desired, elevated pressures as high as 100 atmospheres may be used. For reaons of convenience and economy it is preferred to use atmospheric pressures. The temperature of reaction may be varied over a wide range; for example, from about 20° to about 180° C. Reaction temperatures between about 60° to about 100° C. yield the best results.

The preferred metal borohydrides are those of the alkali metals, such as sodium, potassium and lithium. The alkali metal borohydrides are even more insensitive to moisture and oxygen than lithium aluminum hydride, so insensitive in fact, that they may be dissolved in water at a temperature of about 30° C. with very little decomposition.

The preferred procedure involves the separate heating of the borohydride and aluminum halide to a temperature between about 60° and 110° C. for a period of at least 30 minutes prior to the addition of the group IV$b$ metal halide and the initiation of ethylene polymerization, although polymerization may also be obtained by mixing the three catalyst components directly in a hydrocarbon solvent and passing ethylene gas into the mixture.

The polyethylenes produced in accordance with this invention are highly crystalline materials whose melting points are generally in the range of about 125° to 140° C. The melting point, in this case, is determined by placing a sample of the polyethylene on a melting point block and observing the temperature at which the sample begins to become clear and lose its crystallinity. Many of these polyethylenes do not become fluid melts until they are heated to temperatures of 200° C. or above. Their physical properties differ markedly from those of conventional polyethylenes produced by polymerization of ethylene under high pressures in the presence of free-radical-producing catalysts. For example, they are harder and stronger than the conventional polyethylenes.

The following examples are given to illustrate this invention further. All "parts" therein are by weight unless otherwise specified.

Example I

This example is illustrative of polymerization with a catalyst containing lithium aluminum hydride in accordance with the prior application of Carl N. Zellner, cited above.

304 parts of dry xylene was charged to a reaction vessel, equipped with a stirrer, a reflux condenser, a gas inlet tube, and a thermometer. 11.4 parts of powdered lithium aluminum hydride and 13.3 parts of anhydrous aluminum chloride were added and the mixture was then stirred for 30 minutes at 80° C. and for an additional 30 minutes at 100° C. under an atmosphere of nitrogen. The mixture was then cooled to room temperature and a solution of 20.7 parts of titanium tetrachloride in 26.1 parts of xylene was added slowly. Ethylene was introduced at a rate somewhat higher than it could be consumed so that a minor stream of ethylene issued from the exit. The rate of introduction of ethylene was decreased in stages as the reaction proceeded and the rate of consumption diminished but was always sufficient to maintain a bare excess of ethylene. The temperature was maintained at 80° C. by external heating. After 4 hours the mixture was poured into 1200 parts of methanol, acidified with 60 parts of concentrated hydrochloric acid and filtered. A yield of 27.6 parts of solid polyethylene with a melting range of 90 to 118° C. was obtained.

Example II 304 parts of dry xylene was charged to the reaction vessel of Example I. 11.8 parts of powdered sodium borohydride and 13.3 parts of anhydrous aluminum chloride were added and the mixture was stirred for 30 minutes at 80° C. under an atmosphere of ethylene. The temperature was then raised to 100° C. and this temperature was maintained for another 30 minutes. The mixture was cooled to 35° C. with continued stirring and a solution of 20.7 parts of titanium tetrachloride in 26.1 parts of xylene was added slowly. Ethylene was introduced at a rate somewhat higher than it could be consumed so that a minor stream of ethylene issued from the exit. The rate of ethylene was decreased in stages as the reaction proceeded and the rate of consumption diminished but was always sufficient to maintain a bare excess of ethylene. The polymerization of ethylene began with a spontaneous rise in temperature, which was maintained at 80° C. by external cooling. Three hours and twenty minutes after the initiation of polymerization, the reaction mixture was poured into 1200 parts of methanol and filtered. The filtered material was treated successively with dilute aqueous potassium hydroxide solution, dilute alcoholic potassium hydroxide solution, water and methanol to yield 140 parts of a white powdery polymer, having a melting range of 85 to 120° C.

As may be seen from a comparison of Examples I and II, the use of sodium borohydride in place of lithium aluminum hydride with the same molar quantities of catalyst components and the same reaction conditions leads to a very great increase in the production of polyethylene despite the shorter reaction time.

Example III 16.2 parts of potassium borohydride was used in place of the sodium borohydride of Example II, using the same method of catalyst preparation and the same apparatus. 0.38 part per minute of ethylene was introduced for 4½ hours. 46 parts of polyethylene having a melting range of 80 to 110° C. was obtained.

Example IV 304 parts of xylene, 11.8 parts of sodium borohydride, 13.3 parts of aluminum chloride and 20.7 parts of titanium tetrachloride were placed in the same reaction vessel described in Example I. Ethylene was passed into the vigorously agitated mixture at a rate somewhat higher than it could be consumed and the rate of introduction was reduced as the rate of consumption dropped. The reaction was stopped after 4 hours and the product was purified as described in Example II. 9.6 parts of polyethylene with a melting range of 115 to 130° C. was obtained. It is to be noted that this production of ethylene was not as high as that of Example II where the borohydride and aluminum chloride were first heated separately.

Example V 304 parts of xylene, 11.8 parts of sodium borohydride and 13.3 parts of aluminum chloride were heated to 130° C. for 15 minutes in an atmosphere of ethylene. The reaction mixture was cooled to 35° C. and 20.7 parts of titanium tetrachloride was added while ethylene was being passed in at a rate somewhat in excess of the consumption rate. The temperature was raised to 130° C. by external heating and the ethylene feed rate was lowered during the run as the consumption rate dropped. After four hours the reaction was stopped. 16.4 parts of solid polyethylene with a melting range of 85 to 125° C. was obtained.

From a comparison of Examples II and V, it may be seen that a polymerization temperature of 130° C. is not as favorable as one of 80° C.

It is to be understood that the foregoing detailed description is merely given by way of illustration and that many variations may be made therein without departing from the spirit of our invention.

Having described our invention, what we desire to secure by Letters Patent is:

1. Process for the production of polymers which comprises catalytically polymerizing ethylene in the presence of a catalyst consisting essentially of the product formed by mixing an alkali metal borohydride, an aluminum halide and a halide of a metal of group IV$b$ to obtain solid polymers.

2. Process for the production of polymers which comprises polymerizing ethylene in intimate contact with solid catalyst in the presence of a substantially inert solvent for ethylene to obtain solid polymers, said catalyst consisting essentially of the product formed by mixing an alkali metal borohydride, an aluminum halide and a halide of a metal of group IV$b$.

3. Process for the production of polymers which comprises polymerizing ethylene at a temperature between about 20° and about 180° C. by intimate contact with a solid catalyst in the presence of a substantially inert solvent to obtain solid polymers, said catalyst consisting essentially of the product formed by mixing an alkali metal borohydride, aluminum chloride and titanium tetrachloride.

4. The process of claim 3 wherein said aluminum chloride, titanium chloride and alkali metal borohydride are present in proportions ranging from 0.1:0.1:1.0 to 1:1:1, respectively.

5. Process for the production of polymers which comprises polymerizing ethylene by intimate contact with a solid catalyst in the presence of a substantially inert solvent for ethylene to obtain solid polymers, said catalyst consisting essentially of the product formed by mixing an alkali metal borohydride with an aluminum halide, heating said mixture to a temperature between about 60° and about 110° C. and thereafter adding a tetrahalide of a metal of group IV$b$.

6. Process for the production of polymers which comprises polymerizing ethylene by intimate contact with a solid catalyst in the presence of a substantially inert solvent for ethylene to obtain solid polymers, said catalyst consisting essentially of the product formed by mixing sodium borohydride, aluminum chloride and titanium tetrachloride.

7. Process for the production of polymers which comprises polymerizing ethylene by intimate contact with a solid catalyst in the presence of a hydrocarbon solvent to obtain said polymers, said catalyst consisting essentially of the product formed by mixing sodium borohydride, aluminum chloride and titanium tetrachloride.

8. Process for the production of polymers which comprises polymerizing ethylene at a temperature between about 60° and about 110° C. by intimate contact with a solid catalyst in the presence of a substantially inert solvent for ethylene to obtain solid polymers, said catalyst consisting essentially of the product formed by mixing sodium borohydride and aluminum chloride, heating said mixture to a temperature between about 60° and about 110° C., and thereafter adding titanium tetrachloride.

9. A polymerization catalyst consisting essentially of the product formed by mixing an alkali metal borohydride, an aluminum halide and a halide of a metal of group IV$b$.

10. The catalyst of claim 9 wherein said aluminum chloride, titanium chloride and alkali metal borohydride are present in proportions ranging from 0.1:0.1:1.0 to 1:1:1, respectively.

11. A polymerization catalyst consisting essentially of the product formed by mixing sodium borohydride, aluminum chloride and titanium tetrachloride.

12. A polymerization catalyst consisting essentially of the product formed by mixing sodium borohydride and aluminum chloride, heating the admixture to a temperature between about 60° and about 110° C. and thereafter adding titanium tetrachloride.

13. Process for making a polymerization catalyst which comprises mixing an alkali metal borohydride, an aluminum halide and a halide of a metal of group IV$b$.

14. Process for making a polymerization catalyst which comprises mixing sodium borohydride, aluminum chloride and titanium tetrachloride.

15. Process for making a polymerization catalyst which comprises mixing sodium borohydride with aluminum chloride, heating the mixture to a temperature between about 60° and about 110° C., and thereafter adding titanium tetrachloride.

16. Process for the production of polymers which comprises polymerizing ethylene by intimate contact with a solid catalyst in the presence of a substantially inert solvent for ethylene to obtain solid polymers, said catalyst consisting essentially of the product formed by mixing sodium borohydride, aluminum chloride, titanium tetrachloride and a solid inert carrier.

17. A polymerization catalyst consisting essentially of the product formed by mixing sodium borohydride, aluminum chloride, titanium tetrachloride and a solid inert carrier.

References Cited in the file of this patent
UNITED STATES PATENTS

| | | |
|---|---|---|
| 2,721,189 | Anderson et al. | Oct. 18, 1955 |
| 2,728,757 | Field et al. | Dec. 27, 1955 |
| 2,822,357 | Brebner et al. | Feb. 4, 1958 |
| 2,919,267 | Juveland et al. | Dec. 29, 1959 |

FOREIGN PATENTS

| | | |
|---|---|---|
| 543,941 | Belgium | June 26, 1956 |
| 547,618 | Belgium | Nov. 7, 1956 |
| 874,215 | Germany | Apr. 20, 1953 |
| 801,401 | Great Britain | Sept. 10, 1958 |